United States Patent
Alabbasi et al.

(10) Patent No.: US 12,356,413 B2
(45) Date of Patent: Jul. 8, 2025

(54) MULTIPLE GRANT HANDLING IN MIXED SERVICES SCENARIOS

(71) Applicant: Telefonaktiebolaget LM Ericsson (PUBL), Stockholm (SE)

(72) Inventors: Abdulrahman Alabbasi, Kista (SE); Torsten Dudda, Wassenberg (DE); Zhenhua Zou, Solna (SE); Henrik Enbuske, Stockholm (SE); Jose Luis Pradas, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 600 days.

(21) Appl. No.: 17/429,825

(22) PCT Filed: Feb. 12, 2020

(86) PCT No.: PCT/EP2020/053644
§ 371 (c)(1),
(2) Date: Aug. 10, 2021

(87) PCT Pub. No.: WO2020/165281
PCT Pub. Date: Aug. 20, 2020

(65) Prior Publication Data
US 2022/0132556 A1    Apr. 28, 2022

Related U.S. Application Data

(60) Provisional application No. 62/805,906, filed on Feb. 14, 2019.

(51) Int. Cl.
*H04W 72/14* (2009.01)
*H04L 1/1812* (2023.01)
(Continued)

(52) U.S. Cl.
CPC ........... *H04W 72/23* (2023.01); *H04L 1/1812* (2013.01); *H04W 72/569* (2023.01); *H04W 80/02* (2013.01)

(58) Field of Classification Search
CPC ... H04W 72/569; H04W 72/23; H04W 80/02; H04L 1/1812
See application file for complete search history.

(56) References Cited

U.S. PATENT DOCUMENTS

| | | | |
|---|---|---|---|
| 2011/0134829 A1* | 6/2011 | Chen | H04L 1/1854 370/328 |
| 2018/0092122 A1* | 3/2018 | Babaei | H04L 1/1822 |

(Continued)

FOREIGN PATENT DOCUMENTS

| | | |
|---|---|---|
| CN | 107852289 A | 3/2018 |
| JP | 2015 531220 A | 10/2015 |

(Continued)

OTHER PUBLICATIONS

PCT Notification of Transmittal of the International Search Report and the Written Opinion of the International Searching Authority, or the Declaration issued for International application No. PCT/EP2020/053644—Apr. 20, 2020.

(Continued)

*Primary Examiner* — Syed Ali
(74) *Attorney, Agent, or Firm* — Baker Botts L.L.P.

(57) ABSTRACT

According to certain embodiments, a method performed by a wireless device comprises receiving a first grant and a second grant from a network node. The first grant and the second grant are overlapping. The method comprises determining a prioritized one of the first grant and the second grant and constructing a Medium Access Control (MAC) Protocol Description Unit (PDU) for the prioritized grant of the first grant and the second grant. According to certain embodiments, a method performed by a network node (Continued)

comprises transmitting a first grant and a second grant to a wireless device. The first grant and the second grant are overlapping. The method comprises receiving a transmission from the wireless device on a prioritized one of the first grant and the second grant.

20 Claims, 12 Drawing Sheets

(51) Int. Cl.
  *H04W 72/23* (2023.01)
  *H04W 72/566* (2023.01)
  *H04W 80/02* (2009.01)

(56) References Cited

U.S. PATENT DOCUMENTS

| | | | |
|---|---|---|---|
| 2019/0182870 A1* | 6/2019 | Shih | H04W 74/0833 |
| 2019/0350045 A1* | 11/2019 | Lee | H04L 1/0003 |
| 2019/0357178 A1* | 11/2019 | Bae | H04L 5/0044 |
| 2020/0059844 A1* | 2/2020 | Lee | H04W 80/02 |
| 2021/0243784 A1* | 8/2021 | Goto | H04W 72/21 |
| 2021/0368534 A1* | 11/2021 | Sato | H04W 72/569 |
| 2022/0007230 A1* | 1/2022 | Chen | H04W 72/21 |
| 2022/0103298 A1* | 3/2022 | Lee | H04L 1/1883 |
| 2022/0240300 A1* | 7/2022 | Loehr | H04L 5/0048 |
| 2024/0314793 A1* | 9/2024 | Pelletier | H04W 72/23 |

FOREIGN PATENT DOCUMENTS

| | | |
|---|---|---|
| WO | 2018 070465 A1 | 4/2018 |
| WO | 2018 083855 A1 | 5/2018 |
| WO | 2018 092882 A1 | 5/2018 |
| WO | 2018 143741 A1 | 8/2018 |
| WO | WO2018211364 A1 | 11/2018 |

OTHER PUBLICATIONS

3GPP TSG-RAN WG1 Ad-Hoc Meeting 1901; Taipei, Taiwan; Source: Nokia, Nokia Shanghai Bell; Title: Summary of Offline Discussions on UL/DL Intra-UE Prioritization/Multiplexing (R1-1901428)—Jan. 21-25, 2019.
3GPP TSG-RAN WG2 #104; Spokane, USA; Source: Nokia (Rapporteur); Title: E-mail discussion summary [103bis#41] [ NR/IIot] Intra-UE Prioritization (Nokia) (Tdoc R2-1817579)—Nov. 12-16, 2018.
3GPP TSG-RAN WG2 Meeting #108; Reno, USA; Source: CATT; Title: Summary of offline #40 on UE autonomous (re)transmission (R2-1916531)—Nov. 18-22, 2019.
PCT International Search Report issued for International application No. PCT/EP2020/053644—Apr. 20, 2020.
PCT Written Opinion of the International Searching Authority issued for International application No. PCT/EP2020/053644—Apr. 20, 2020.
Office Action issued for Japanese Patent Application No. 2021-547510—Dec. 19, 2022.
3GPP TSG-RAN WG2 Meeting #104, Spokane, USA; Source: vivo; Title: Interaction between MAC and PHY for intra-UE prioritization (R2-1816942)—Nov. 12-16, 2018.
Ohtsuka Report as of Jan. 25, 2023; Japanese Patent Application No. 2021-547510.
3GPP TSG RAN WG1 Ad-Hoc Meeting 1901; Taipei, Jan. 21-25, 2019; Source: CATT; Title: Discussion on intra-UE multiplexing scenarios; Agenda Item: 7.2.6.4 (R1-1900337).
3GPP TSG-RAN WG2 Meeting #105bis; Xi'an, China, Apr. 8-12, 2019; Agenda item: 11.7.3; Source: Samsung; Title: Prioritization between Data Resources (R2-1904919).
Notification of Reasons for Refusal issued for Japanese Patent Application 2021-547510—Aug. 28, 2023.
Office Action issued for Chinese Patent Application Serial No. 202080028746.7—Nov. 30, 2023.
Search Report issued for Chinese Patent Application Serial No. 2020800287467—Nov. 28, 2023.

* cited by examiner

MULTIPLE GRANT HANDLING IN MIXED SERVICES SCENARIOS

PRIORITY

This nonprovisional application is a U.S. National Stage Filing under 35 U.S.C. § 371 of International Patent Application Serial No. PCT/EP2020/053644 filed Feb. 12, 2020 and entitled "MULTIPLE GRANT HANDLING IN MIXED SERVICES SCENARIOS" which claims priority to U.S. Provisional Patent Application No. 62/805,906 filed Feb. 14, 2019 both of which are hereby incorporated by reference in their entirety.

BACKGROUND

The present disclosure is described within the context of Fifth Generation (5G) New Radio (NR) radio technology described by the Third Generation Partnership Project (3GPP), such as in 3GPP Technical Specification (TS) 38.300 V15.2.0 (2018 June). Because NR is an example technology for which certain embodiments of the disclosure are suitable, certain embodiments are described with reference to NR. While the examples related to NR may aid in understanding the problems that currently exist and the solutions proposed herein, it is to be understood that the problems and the solutions are equally applicable to wireless access networks and user equipment (UEs) implementing other access technologies and standards. In particular, certain embodiments of the disclosure may be applicable to 3GPP Long Term Evolution (LTE), or 3GPP LTE and NR integration, also denoted as non-standalone NR.

In a newly defined 3GPP study item (RP-182090, Revised SID: Study on NR Industrial Internet-of-Things (IIoT)), NR technology enhancements are studied with the target of providing more deterministic low-latency delivery of data. This traffic may also be referred to as time-sensitive networking (TSN) traffic with typically periodic packet occurrences per cycle time.

A network node, such as a Next Generation NodeB (gNB), can schedule uplink (UL) traffic according to dynamic UL grants or configured UL grants. Dynamic grants provide an UL grant to the UE for each UL transmission. Configured grants are pre-allocated, i.e., provided once to the UE, and thereafter the configured UL grant is valid for use for UL transmissions according to a configured periodicity. The UE does not need to transmit padding on those UL resources if no UL data is available for transmission, i.e., the UE may skip an UL transmission on such grants.

A typical NR-Internet of Things (IoT) device would handle communication for multiple service types, e.g., multiple periodic Ultra-Reliable Low-Latency Communication (URLLC) type robot control messages (also referred to as TSN-like traffic), URLLC type occasional alarm signals (for which periodic resources would need to be configured or rely on the UE to send a scheduling request for each occasional alarm message), occasional sensor data transmission (which can be time-critical or non-time-critical), or other Enhanced Mobile Broadband (eMBB) or Mobile Broadband (MBB) best-effort type traffic, such as occasional video transmissions or software updates. As a result, a mix of different types of traffic may be multiplexed by the UE for UL transmissions, i.e., on Medium Access Control (MAC) multiple logical channels with different priorities that would need to be configured. Even though the traffic may be mixed, it may still be desirable to treat URLLC-type of traffic with higher priority.

SUMMARY

There currently exist certain challenge(s). As discussed above, there may be two type of grants, i.e., dynamic UL grants and configured UL grants, which can be allocated to either URLLC traffic or eMBB traffic in which each of the eMBB and URLLC traffic can be periodic or aperiodic. Furthermore, multiple periodic URLLC flows may need to be supported and each flow may be served by one configured grant. As a result, there is a high probability that the allocated grants might overlap. Existing standards and implementations fail to provide an overall framework to treat all of these service-mixed use cases.

In particular, it is unresolved how the UE may decide how to treat traffic when receiving overlapping grants in a mixed-traffic scenario. Addressing this issue may result in improvements to the spectral efficiency and addressing the URLLC Quality of Service (QoS) requirements. Furthermore, it is unresolved how to identify whether the UE should select between two overlapping grants on the MAC (i.e., build one MAC protocol data unit (PDU)) or whether the UE should cancel/pre-empt one of grants on the Physical Layer (PHY). To address the problems consistently, such an identification process should be independent of UE's capabilities and MAC processing time.

Certain aspects of the present disclosure and their embodiments may provide solutions to these or other challenges. For example, certain embodiments address the scenarios where a UE must handle multiple grants (overlapping or non-overlapping) received from gNB. Certain embodiments may allow for handling multiple grants in a manner that enhances the system's spectral efficiency while maintaining the URLLC QoS requirements. Furthermore, certain methods and algorithms are provided that can be implemented to handle the aforementioned grant selection and pre-emption issues. Additionally, a pre-emption indicator may be provided that assists in solving issues that result from a UE MAC deciding to pre-empt a grant.

There are, proposed herein, various embodiments which address one or more of the issues disclosed herein.

According to certain embodiments, a method performed by a wireless device comprises receiving a first grant and a second grant from a network node. The first grant and the second grant are overlapping. The method comprises determining a prioritized one of the first grant and the second grant and constructing a MAC PDU for the prioritized grant of the first grant and the second grant.

According to certain embodiments, a wireless device comprises power supply circuitry and processing circuitry. The power supply circuitry is configured to supply power to the wireless device. The processing circuitry is configured to receive a first grant and a second grant from a network node. The first grant and the second grant are overlapping. The processing circuitry is configured to determine a prioritized one of the first grant and the second grant, and to construct a MAC PDU for the prioritized grant of the first grant and the second grant.

According to certain embodiments, a computer program comprises instructions that, when executed on a computer, cause the computer to perform a method comprising receiving, from a network node, a first grant and a second grant that are overlapping, determining a prioritized one of the first grant and the second grant, and constructing a MAC PDU for the prioritized grant of the first grant and the second grant.

Certain embodiments of the method, wireless device, and/or computer program described in the three previous paragraphs may include additional features, such as any one or more of the following features:

In certain embodiments, constructing the MAC PDU for the prioritized grant comprises constructing a new MAC PDU for the prioritized grant of the first grant and the second grant based on not having begun construction of any MAC PDU for the first grant prior to receiving the second grant.

In certain embodiments, when the wireless device has not begun construction of any MAC PDU for the first grant prior to receiving the second grant, only one MAC PDU is constructed with respect to the first grant and the second grant that are overlapping. The only one MAC PDU is constructed for the prioritized grant of the first grant and the second grant.

In certain embodiments, when the second grant is determined to be the prioritized grant and construction has begun on a first MAC PDU for the first grant prior to receiving the second grant, constructing the MAC PDU for the prioritized grant comprises constructing the MAC PDU for the second grant and pre-empting the first MAC PDU. Certain embodiments obtain a MAC PDU cancelled indicator at the MAC of the wireless device based on pre-empting the first MAC PDU.

In certain embodiments, when the first grant is determined to be the prioritized grant and construction has begun on a first MAC PDU for the first grant prior to receiving the second grant, constructing the MAC PDU for the prioritized grant comprises ignoring the second grant and proceeding with the first MAC PDU.

Certain embodiments pass the MAC PDU for the prioritized grant to a Hybrid Automatic Repeat Request (HARQ) entity. In certain embodiments, only one MAC PDU is passed to the HARQ entity in response to receiving the first grant and the second grant that are overlapping.

In certain embodiments, one of the first grant and the second grant corresponds to a dynamic grant, and the other of the first grant and the second grant corresponds to a configured grant.

In certain embodiments, one of the first grant and the second grant corresponds to a new transmission, and the other of the first grant and the second grant corresponds to a retransmission.

Certain embodiments determine the prioritized grant based on having data available in an associated logical channel for each of the first grant and the second grant.

Certain embodiments determine the prioritized grant independently of MAC processing time of the wireless device.

In certain embodiments, determining the prioritized one of the first grant and the second grant comprises determining a higher priority grant of the first grant and the second grant. The higher priority grant is determined based on comparing a priority associated with the first grant and a priority associated with the second grant. Constructing the MAC PDU for the prioritized grant comprises constructing the MAC PDU for the higher priority grant of the first grant and the second grant.

Certain embodiments obtain the priority associated with the first grant based on signalling from a network node. In certain embodiments, the signalling from the network node comprises radio resource control (RRC) signalling or downlink control information (DCI). In certain embodiments, the signalling from the network node comprises an index indicating the priority of the first grant. In certain embodiments, the priority associated with the first grant is determined based on a configuration of a physical layer of a transmission associated with the first grant.

In certain embodiments, one of the first grant and the second grant corresponds to a dynamic grant and the other of the first grant and the second grant corresponds to a configured grant. When the priority associated with the first grant equals the priority associated with the second grant, determining the prioritized grant further comprises determining that the dynamic grant has the higher priority.

In certain embodiments, the priority associated with the first grant is based on reliability, latency, or both.

According to certain embodiments, a method performed by a network node comprises transmitting a first grant and a second grant to a wireless device. The first grant and the second grant are overlapping. The method comprises receiving a transmission from the wireless device on a prioritized one of the first grant and the second grant.

According to certain embodiments, a network node comprises power supply circuitry and processing circuitry. The power supply circuitry is configured to supply power to the network node. The processing circuitry is configured to transmit a first grant and a second grant to a wireless device. The first grant and the second grant are overlapping. The processing circuitry is configured to receive a transmission from the wireless device on a prioritized one of the first grant and the second grant.

According to certain embodiments, a computer program comprises instructions that, when executed on a computer, cause the computer to perform a method comprising transmitting, to a wireless device, a first grant and a second grant that are overlapping, and receiving a transmission from the wireless device on a prioritized one of the first grant and the second grant.

Certain embodiments of the method, network node, and/or computer program described in the three previous paragraphs may include additional features, such as any one or more of the following features:

In certain embodiments, one of the first grant and the second grant corresponds to a dynamic grant and the other of the first grant and the second grant corresponds to a configured grant.

In certain embodiments, one of the first grant and the second grant corresponds to a new transmission and the other of the first grant and the second grant corresponds to a retransmission.

Certain embodiments indicate, to the wireless device, a priority associated with the first grant. In certain embodiments, the priority associated with the first grant is indicated to the wireless device via RRC signalling or DCI. In certain embodiments, the priority associated with the first grant is indicated to the wireless device using an index. In certain embodiments, the priority associated with the first grant is indicated to the wireless device based on a configuration of a physical layer of a transmission associated with the first grant.

In certain embodiments, one of the first grant and the second grant corresponds to a dynamic grant, and the other of the first grant and the second grant corresponds to a configured grant. When the priority associated with the first grant equals the priority associated with the second grant, receiving the transmission from the wireless device on the prioritized one of the first grant and the second grant comprises receiving the transmission on the dynamic grant.

Certain embodiments determine priority associated with the first grant based on reliability, latency, or both.

Certain embodiments may provide one or more of the following technical advantage(s). For example, certain embodiments provide an efficient manner for UEs to react when receiving overlapping grants, e.g., in response to mixed-service traffic requests. In particular, some embodiments ensure that critical traffic QoS is met and/or the system spectral efficiency is not reduced.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1A:
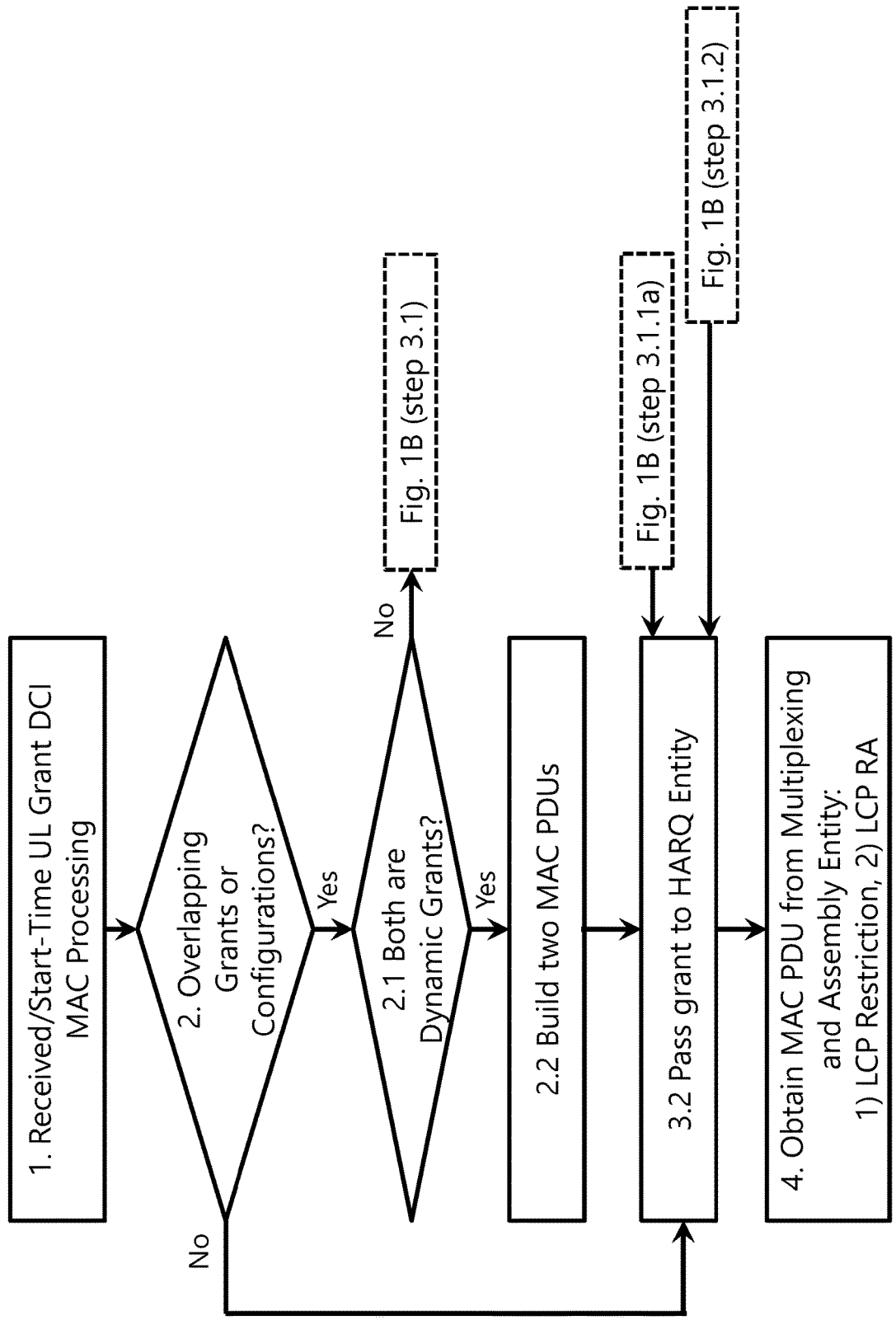
FIGS. 1A-1B illustrate an example of a method of determining how to handle overlapping grants in accordance with certain embodiments, the method may be implemented in a wireless device.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In certain embodiments, when a UE is configured with overlapping grants either through configured grant configuration or dynamic scheduling of dynamic UL grants, the UE may decide how to construct the MAC PDU, and which grant to use based on the one or more of the following criteria.

In certain embodiments, the UE can decide how to construct the MAC PDU based on the grant's priority. Certain embodiments determine the grant's priority using a transmission profile indication or index (TPI). The grant's TPI may be defined as a value that marks and measures the grant's reliability (and possibly latency) as a function of the Modulation Coding Scheme (MCS), coding rate, repetition, etc. The higher a grant's transmission profile index reflects a higher reliability and/or a lower latency for the grant. Alternatively, TPI may be defined as the grant (or group of grants) indication that identifies which Logical Channel (LCH) (or group of LCHs) is allowed (based on Logical Channel Prioritization (LCP) procedures, such as in 3GPP TS 38.321 clause 5.4.3.1) to be sent on such grant's resources.

In certain embodiments, the TPI can be implicit such as being inferred from a lower MCS, lower coding rate, the configuration of a repetition, etc. In some examples, the TPI can be based on (i.e., inferred from) a configuration of the physical layer of the transmission associated with the grant. In some embodiments, the indication can also be explicitly transmitted to UE from gNB through, for example, DCI or RRC configuration. In some embodiments, the term grant's transmission profile indicator may be replaced by grant's priority or referred as the grant's priority.

In certain embodiments, the UE can decide how to construct the MAC PDU based on whether there is any data in the LCH that can be multiplexed on the grant after subject to the LCH mapping restriction. This may be considered using either the conventional restriction in rel-15 or the newly defined restriction related with the reliability of the grant.

In another example, the UE decides how to construct the MAC PDU based on considering whether or not any MAC PDU is constructed (assembled in MAC with logical channel data and/or submitted to physical layer for transmission), according to certain embodiments.

As yet another example, the UE may consider the Transport block (TB) size associated with the grant in determining how it handles overlapping grants and constructing the MAC PDU, according to certain embodiments.

Figure 1B:
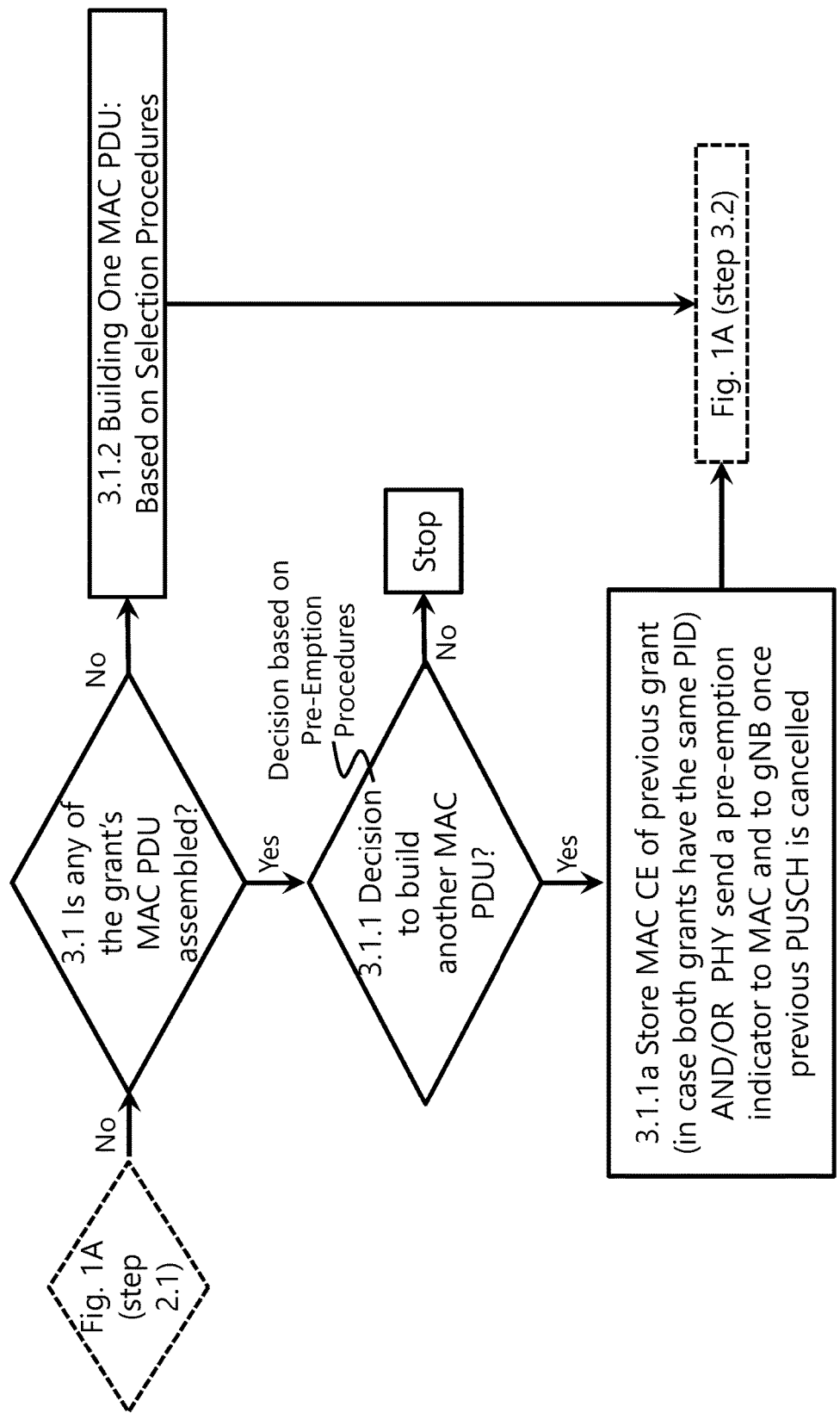

While example criteria have been explained above, embodiments describing how these criteria may be utilized by the UE are described further, including in reference to FIGS. 1A-1B.

According to certain embodiments, a new functionality may be provided that may be implemented in the MAC layer and/or with the Assembly and Multiplexing Entity. This new functionality may link or map the LCH's priority to the grant's priority (e.g., TPI) to help in identifying the data arrival/availability on the LCH that is linked to each grant. For example, transmission of certain logical channels should only be allowed on grants providing sufficient reliability. Accordingly, these LCHs may be configured with restrictions that prevent transmitting on grants with insufficient reliability. Herein, the concept of "LCH associated with a grant," or equivalent, indicates an LCH that has a priority that matches that of the grant. For example, the LCH may have a priority that matches the grant if the grant has sufficient reliability that the LCH is configured to be transmitted on the grant, e.g., not restricted.

This disclosure considers that when the MAC PDU of a grant is assembled by MAC, it will be sent to PHY layer for transmission immediately. Alternatively, if not sent to PHY for transmission immediately, the following described techniques related to whether or not the MAC PDU is constructed may be applied to whether or not the MAC PDU is submitted to PHY transmission. For example, instead of using the described methods and criteria for determining whether MAC PDU is constructed, those methods and criteria may determine whether the MAC PDU is submitted to PHY transmission.

FIGS. 1A-1B represent an example algorithm that addresses the earlier-described mixed-services issues. The algorithm may begin at when MAC processing starts for an UL grant (step 1). At step 2, the method comprises checking whether there is an overlapping of grants. If there is no overlapping grant, the method proceeds to step 3.2 where the normal MAC procedures continue. However, if at step 2 there are overlapping grants AND at step 2.1 both of them are dynamic grants, the method proceeds to step 2.2 where the MAC layer in the UE decides to build two MAC PDUs and sends both MAC PDUs to PHY layer with the understanding that the later grant has a higher TPI. For example, the PHY layer can perform cancelation if one transmission has not started (subject to other processing timing limitation) or pre-emption if one transmission has started or cannot be stopped. Whether a grant is "later" may be based on the timing of DCI reception for the grant relative to the overlapping grant. Accordingly, this decision reflects that the gNB issuing the dynamic grants is aware of the impact of sending both grants and that sending the later grant may be intentional by the gNB, i.e., the selection of the later grant by the UE is intended by sending the two dynamic grants by the gNB and should not be conditional. Thus, as can be seen in FIG. 1A, step 2.2 is followed by step 3.2 (grant passed to HARQ entity) and step 4 (obtain MAC PDU from multiplexing and assembly entity).

If, however, at step 2.1 at least one of the overlapping grants is not a dynamic grant, the UE may proceed to step 3.1 of FIG. 1B to determine if any of the grant's MAC PDU is assembled. For example, if at step 3.1 the MAC PDU has not yet been constructed, the method may proceed to step 3.1.2 to build one MAC PDU based on selection procedures.

For example, due to a Selection Procedure, when the MAC PDU of a previous grant has not been assembled by MAC, the UE can select not to construct the MAC PDU of the original/previous grant but assemble MAC PDU according to the new/selected grant. The UE may select between grants to determine which one to use. If both grants have available data in the associated LCHs (e.g., such LCHs are not restricted out of both grants) the UE may choose the grant with higher TPI. Otherwise, the UE may choose the grant which has available data in LCH which is mapped to its TPI (or in the associated LCH). After building the MAC PDU in step 3.1.2, the method proceeds to step 3.2 of FIG. 1A.

If it is determined at step 3.1 of FIG. 1B that any of the grant's MAC PDU has been assembled, the method proceeds to step 3.1.1. At step 3.1.1, the method decides, based on pre-emption procedures, whether to build another MAC PDU. If no, the method stops, if yes, the method proceeds to step 3.1.1a. In the situation where, due to a Pre-emption Procedure, the UE may select grants differently. For example, when the MAC PDU of a previous grant has been assembled by MAC, the UE might override parts of the resources used for the MAC PDU/TB according to the original grant, with a newly constructed MAC PDU/TB according to the new/selected grant. In certain embodiments, if the later grant has available data in the associated (or mapped) LCH and it is of higher TPI than the already ongoing grant, then the UE may decide to prepare a new MAC PDU based on the later grant and send it to PHY to pre-empt the existing grant. However, if the later grant does not have available date in the associated LCH, or it has available data in the associated LCH, but it is of lower TPI than the ongoing grant, then the UE may ignore the later grant and does not prepare a new MAC PDU. In this manner a UE may decide how to respond to overlapping grants. In step 3.1.1a, the method may store a MAC CE of the previous grant (in case both grants have the same PID) AND/OR the PHY may send a pre-emption indicator to the MAC and to the gNB once previous PUSCH is cancelled. From step 3.1.1a, the method proceeds to step 3.2 of FIG. 1A.

As mentioned above, after the above procedures, the selected (or pre-empting) grant may be passed to the HARQ entity (step 3.2), which may obtain the MAC PDU from the Assembly and Multiplexing Entity. This entity may construct the MAC PDU based on the selected (decided on) grant's TPI, conventional LCP and restrictions rules, and the reliability restriction.

Once the MAC PDU is obtained, the HARQ entity may pass it to the HARQ process.

According to certain embodiments, the decision whether the grants are dynamic or not dynamic does not result in a different action by the UE. For example, the different decision paths described above may collapse regarding whether the grants are dynamic. In a specific example, even if both overlapping grants are dynamic, the algorithm in FIGS. 1A-1B may proceed from step 1 to step 3.1 without having to perform steps 2, 2.1, and 2.2. In this manner, certain embodiments do not provide special treatments of overlapping dynamic grants (e.g., the treatment that applies when each of the overlapping grants is a dynamic grant can be the same as the treatment that applies when one of the overlapping grants is a dynamic grant and the other of the overlapping grants is a configured grant).

Figure 2:
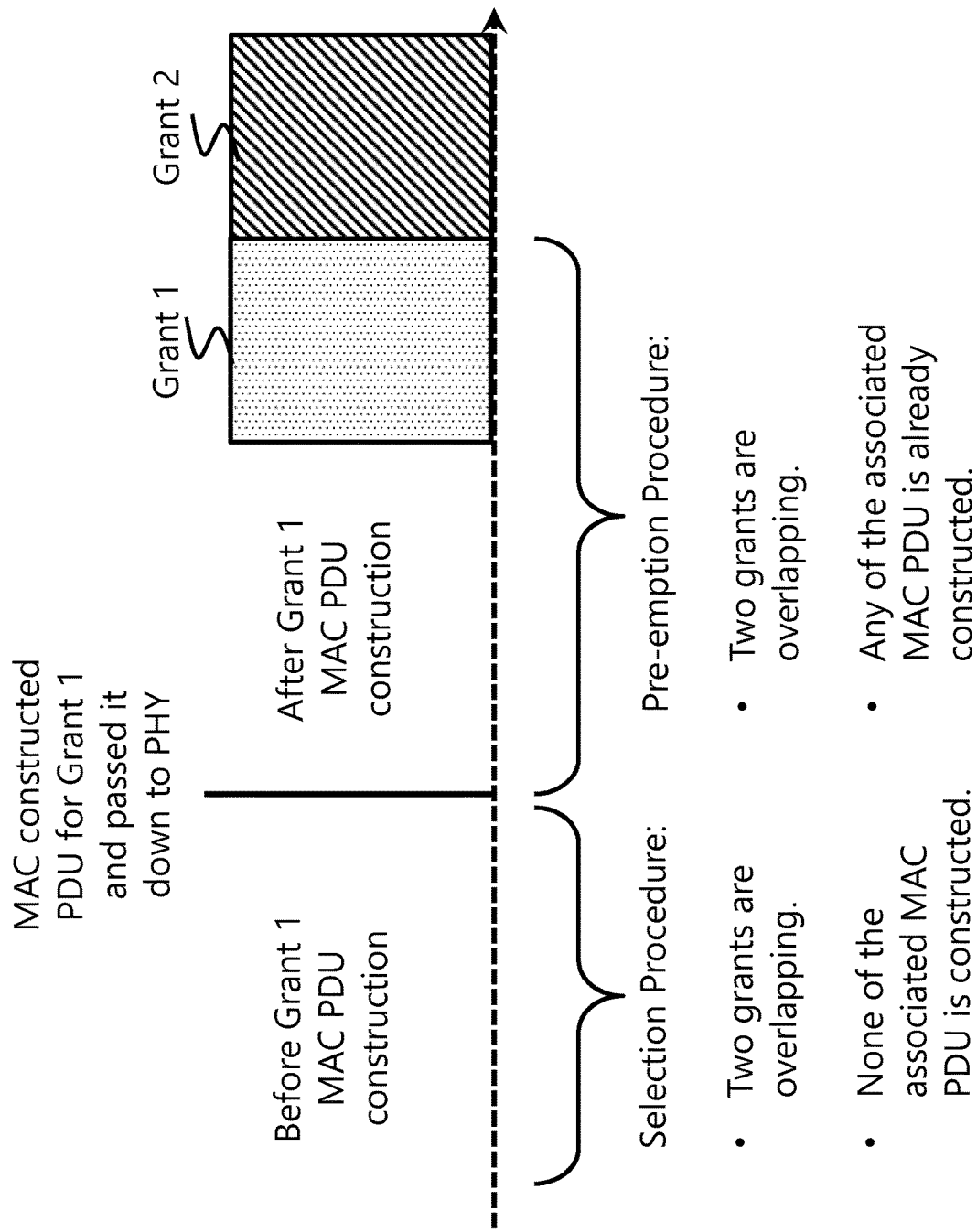
FIG. 2 illustrates an example of a method of determining whether to handle two overlapping grants according to a selection procedure or a pre-emption procedure in accordance with certain embodiments, the method may be implemented by a wireless device.

FIG. 2 illustrates an example in which a UE determines whether to apply a selection procedure (e.g., to select between grants) or a pre-emption procedure (e.g., to possibly pre-empt a previous grant) when handling overlapping grants. For example, FIG. 2 illustrates Grant 1, such as a configured grant (CG), and Grant 2, such as a dynamic grant (DG), as overlapping grants.

In certain embodiments, if two grants are overlapping and none of the associated MAC PDU is constructed, the UE may perform a selection procedure to build a single MAC PDU based on one or more of Grant 1 (CG) and Grant 2 (DG). The selection procedure may select the prioritized grant of the Grant 1 and Grant 2. In particular, if the priority associated with Grant 1 is greater than the priority associated with Grant 2 (if CG's TPI>DG's TPI), then the UE selects Grant 1 (send CG MAC PDU based on the selection procedure). However, if the priority associated with Grant 1 is less than the priority associated with Grant 2 (if CG's TPI<DG's TPI), then the UE selects Grant 2 (send DG MAC PDU based on the selection procedure). If the priority associated with Grant 1 equals the priority associated with Grant 2 (if CG's TPI=DG's TPI), then the UE selects Grant 2 (send DG MAC PDU based on the selection procedure). That is, certain embodiments may prioritize a dynamic grant over an overlapping configured grant when the dynamic grant and the configured grant have equal TPIs.

In certain embodiments, if two grants are overlapping and any of the associated MAC PDU is already constructed, the UE may perform a pre-emption procedure. For example, the pre-emption procedure may determine whether to continue with the MAC PDU for which construction has begun or to build a new MAC PDU that pre-empts the MAC PDU for which construction has begun. In certain embodiments, the UE builds MAC PDU "X" based on the following considerations. In the example, consider the case where any of the MAC PDU associated with the CG (Grant 1) is already constructed. If CG's TPI>DG's TPI, then X=1 and send CG MAC PDU (decision not to pre-empt). If CG's TPI<DG's TPI, then X=2 and send DG MAC PDU (decision to proceed with PHY pre-empt). If CG's TPI=DG's TPI, then X=2 and send DG MAC PDU (decision to proceed with PHY pre-empt). That is, certain embodiments may prioritize a dynamic grant over an overlapping configured grant when the dynamic grant and the configured grant have equal TPIs.

In certain embodiments, if MAC decides on passing the later MAC PDU to PHY to pre-empt the previous one, PHY should send a MAC-PDU-Cancelled-Indicator (MPCI) to MAC once the cancellation of the earlier Physical Uplink Shared Channel (PUSCH) is decided in PHY. Once received, if the MAC does not have resources to transmit the pre-empted PDU, the UE may request new resources by: a) transmitting a buffer status report (BSR), or b) transmitting scheduling request (SR) procedures. Otherwise, the MAC can initiate new transmission of the previous MAC PDU in the next opportunity which was indicated by network.

This procedure may have certain technical advantages. For example, if the UE did not receive any of the gNB's feedback for the CG's transmission, the UE may wrongly assume that the CG PUSCH was received correctly. However, if the gNB did not receive any CG message, then it will not send feedback, hence the UE MAC may assume that CG PUSCH was received correctly. If the UE (MAC) decides on initiating a new transmission (or retransmit), upon reception of the priority indicator (PI) (PHY to MAC), the UE should start at the earliest of the following events: at the expiry of CGTimer, or equivalent MAC timer, the next CG occasions, upon reception of earliest suited dynamic grant, or any equivalent transmission occasion.

Additionally, a network node, such as a gNB that transmits one or more of the overlapping grants, may receive a transmission using one of the overlapping grants based on one or more embodiments described herein describing the manner in which a wireless device may select grants for which to construct a MAC PDU.

Figure 3:
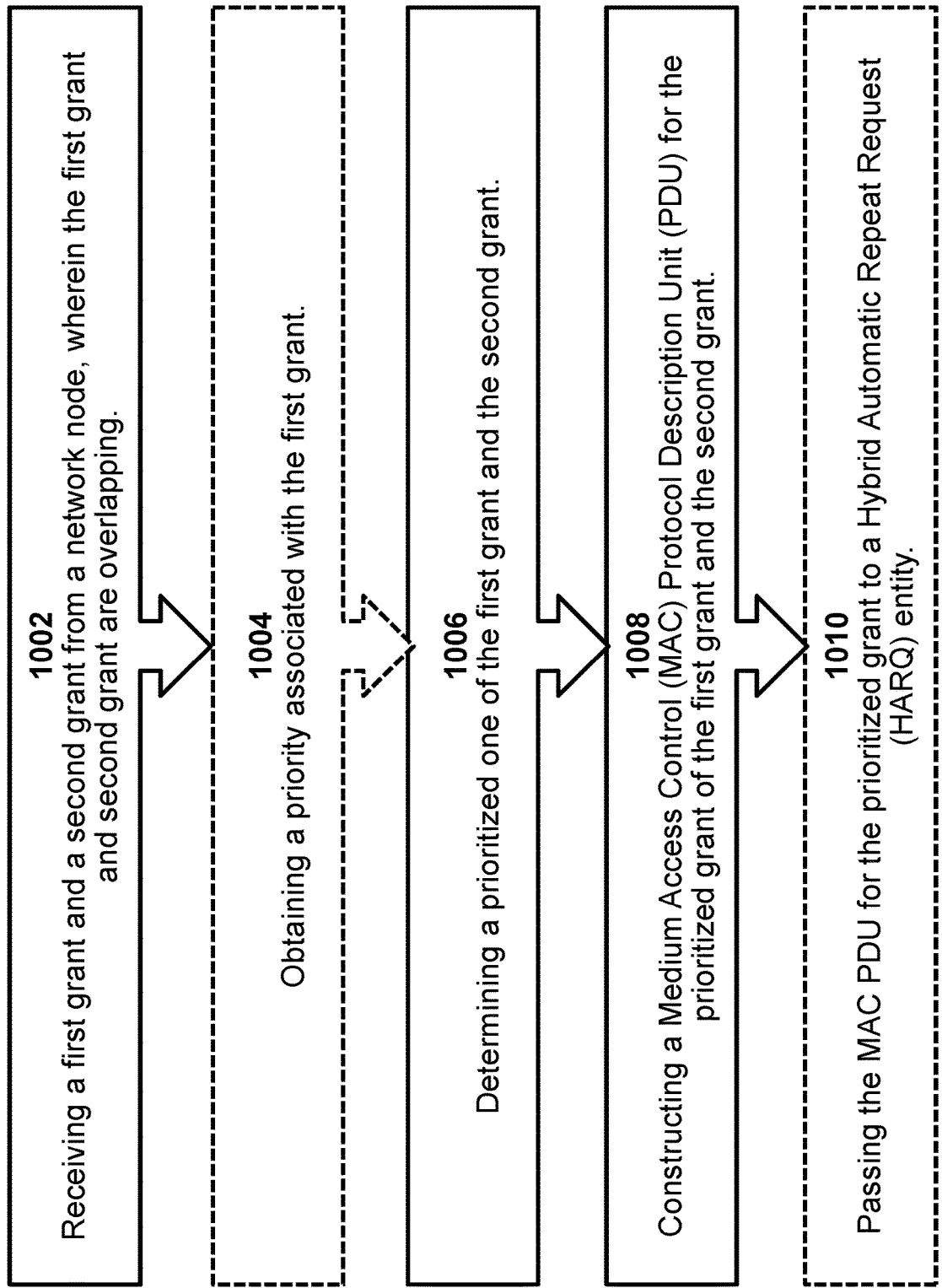
FIG. 3 illustrates an example of a method of constructing a MAC PDU for a prioritized grant in accordance with certain embodiments, the method may be implemented in a wireless device.

FIG. 3 illustrates an example of a method of constructing a MAC PDU for a prioritized grant in accordance with certain embodiments, the method may be implemented in a wireless device, such as wireless device 110 or UE 200 described below.

In step 1002, the method receives a first grant and a second grant from a network node. The first grant and the second grant are overlapping. As an example, the wireless device may receive the first grant in which the network node grants the wireless device permission to use first uplink resources. The wireless device may later receive the second grant in which the network node grants the wireless device permission to use second uplink resources, and the second uplink resources may overlap the first uplink resources. In certain embodiments, the first grant is a dynamic grant and the second grant is a configured grant, or vice versa. The first grant may be for a new transmission or a retransmission on the uplink. Similarly, the second grant may be for a new transmission or a retransmission on the uplink.

In step 1004, which may be optional in certain embodiments, the method obtains a priority associated with the first grant. The priority associated with the first grant may be obtained based on signalling from a network node. In certain embodiments, the wireless device obtains the priority associated with the network node based on RRC signalling or DCI received from the network node. The signalling may explicitly indicate the priority associated with the first grant, or the wireless device may infer the priority from the signalling. In certain embodiments, the signalling from the network node comprises an index, such as a TPI, indicating the priority of the first grant. In certain embodiments, the priority associated with the first grant is determined based on a configuration of the physical layer of the transmission associated with the first grant. For example, an index (e.g., TPI) may be inferred based on a configuration of the physical layer of the transmission associated with the first grant. In certain embodiments, the priority associated with the first grant is based on reliability, latency, or both.

In certain embodiments, the method also obtains the priority associated with the second grant, e.g., based on signalling from a network node. Options for obtaining the priority associated with the second grant may be analogous to the options described above with respect to obtaining the priority associated with the first grant.

In step 1006, the method determines a prioritized one of the first grant and the second grant. For example, if data available is available in both a logical channel associated with the first grant and a logical channel associated with the second grant, the wireless device may need to determine which grant to prioritize. In certain embodiments, the prioritized grant is determined independently of MAC processing time of the wireless device.

The method may determine the prioritized grant based on the priority associated with the first grant and the priority associated with the second grant. As described above with respect to step 1004, the priority associated with the first grant and the priority associated with the second grant may be obtained via signalling from the network node. The priority associated with the first grant may be compared to the priority associated with the second grant to determine which grant has the higher priority. In certain embodiments, if the priority associated with the first grant equals the priority associated with the second grant, and if one of the first grant and the second grant corresponds to a dynamic grant and the other of the first grant and the second grant corresponds to a configured grant, whichever of the first grant and the second grant corresponds to the dynamic grant is determined to have the higher priority (whichever of the first grant and the second grant corresponds to the configured grant is determined to have lower priority).

In step 1008, the method constructs a MAC PDU for the prioritized grant (e.g., the higher priority grant of the first grant and the second grant). Certain embodiments construct the MAC PDU based on either a selection procedure or a pre-emption procedure, as described above with respect to FIGS. 1A-1B and FIG. 2.

The selection procedure may be used when the wireless device has not begun construction of any MAC PDU for the first grant prior to receiving the second grant. Based on not having begun construction of any MAC PDU for the first grant prior to receiving the second grant, the method constructs a new MAC PDU for the prioritized grant of the first grant and the second grant. In certain embodiments, when the wireless device has not begun construction of any MAC PDU for the first grant prior to receiving the second grant, only one MAC PDU (e.g., the new MAC PDU) is constructed with respect to the first grant and the second grant that are overlapping. This MAC PDU is constructed for the prioritized grant of the first grant and the second grant.

The pre-emption procedure may be used when the wireless device has begun construction on a first MAC PDU for the first grant prior to receiving the second grant. As an example, when the first grant is determined to be the prioritized grant in step 1006, the pre-emption procedure comprises ignoring the second grant and proceeding with the first MAC PDU. As another example, when the second grant is determined to be the prioritized grant in step 1006, the pre-emption procedure comprises constructing the MAC PDU for the second grant and pre-empting the first MAC PDU. In certain embodiments, a MAC PDU cancelled indicator is obtained at the MAC of the wireless device based on pre-empting the first MAC PDU.

In step 1010, which may be optional in certain embodiments, the method passes the MAC PDU for the prioritized grant to a HARQ entity. An example of passing the MAC PDU to the HARQ entity is described above with respect to step 3.2 of FIG. 1A. In certain embodiments, only one MAC PDU is passed to the HARQ entity in response to receiving the first grant and the second grant that are overlapping.

Figure 4:
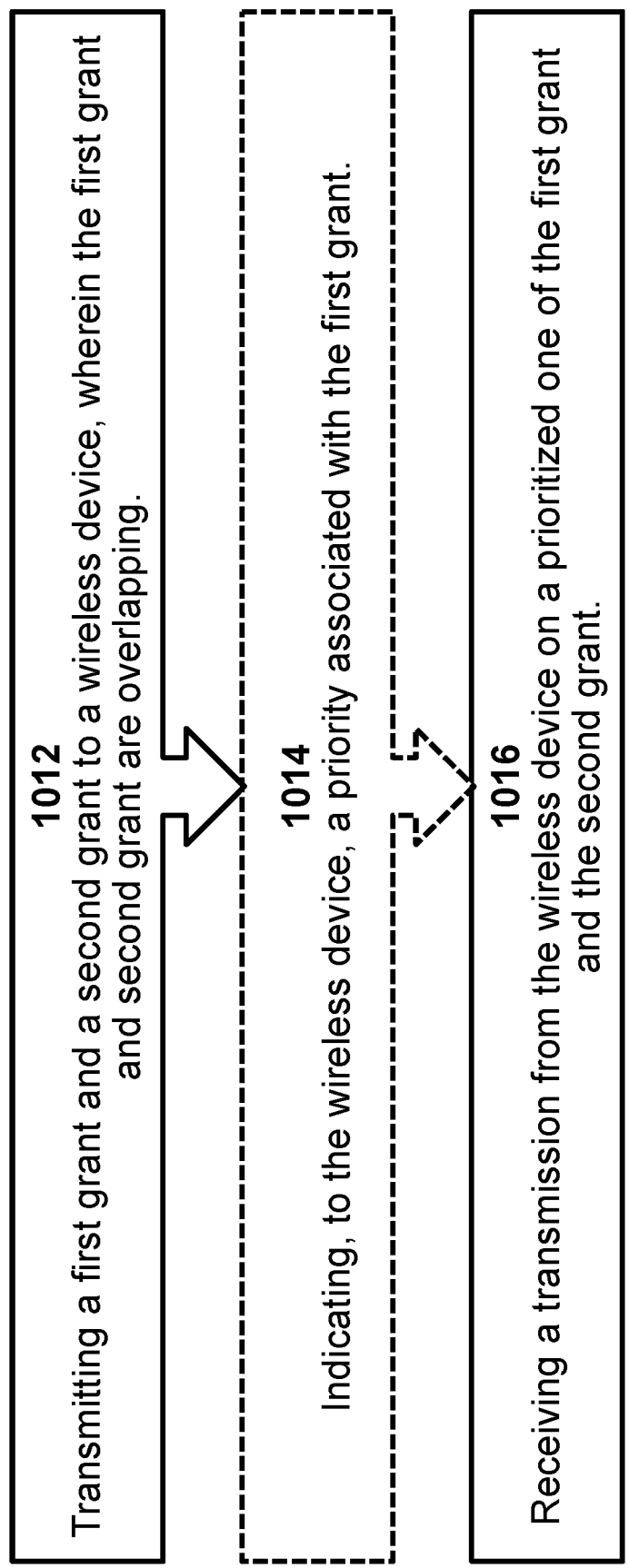
FIG. 4 illustrates an example of a method of receiving a prioritized grant in accordance with certain embodiments, the method may be implemented in a network node.

FIG. 4 illustrates an example of a method of receiving a prioritized grant in accordance with certain embodiments. The method may be implemented in a network node, such as network node 160 described below.

In step 1012, the method transmits a first grant and a second grant to a wireless device. The first grant and the second grant are overlapping. In certain embodiments, one of the first grant and the second grant corresponds to a dynamic grant and the other of the first grant and the second grant corresponds to a configured grant (e.g., the first grant may be a dynamic grant and the second grant may be a configured grant, or vice versa). Both grants may be used for new transmissions, both grants may be used for retransmissions, or one grant may be used for new transmissions and the other grant may be used for retransmissions. For example, in certain embodiments, one of the first grant and the second grant corresponds to a new transmission and the other of the first grant and the second grant corresponds to a retransmission.

In step 1014, which may be optional in certain embodiments, the method indicates to the wireless device a priority associated with the first grant. In certain embodiments, the priority associated with the first grant is indicated to the wireless device via RRC signalling or DCI. In certain embodiments, the priority associated with the first grant is indicated to the wireless device using an index. In certain embodiments, the priority associated with the first grant is indicated to the wireless device based on a configuration of a physical layer of a transmission associated with the first grant (e.g., the physical layer may be configured in a manner that enables the wireless device to infer the priority).

In certain embodiments, the method also indicates to the wireless device a priority associated with the second grant. Options for indicating the priority associated with the second grant may be analogous to the options described above with respect to indicating the priority associated with the first grant.

In certain embodiments, prior to indicating the priority associated with the first grant, the network node determines the priority associated with the first grant. Similarly, prior to indicating the priority associated with the second grant, the network node may determine the priority associated with the second grant. For example, the network node may determine the priority associated with the first grant and/or the priority associated with the second grant based on reliability, latency, or both.

In step 1016, the method receives a transmission from the wireless device on a prioritized one of the first grant and the second grant. As an example, if the indication in step 1014 indicates that the first grant has higher priority, the method receives the transmission on the first grant. As another example, if the indication in step 1014 indicates that the second grant has higher priority, the method receives the transmission on the second grant. In certain embodiments, when one of the first grant and the second grant corresponds to a dynamic grant and the other of the first grant and the second grant corresponds to a configured grant, and when the priority associated with the first grant equals the priority associated with the second grant, the method receives the transmission on the dynamic grant.

Figure 5:
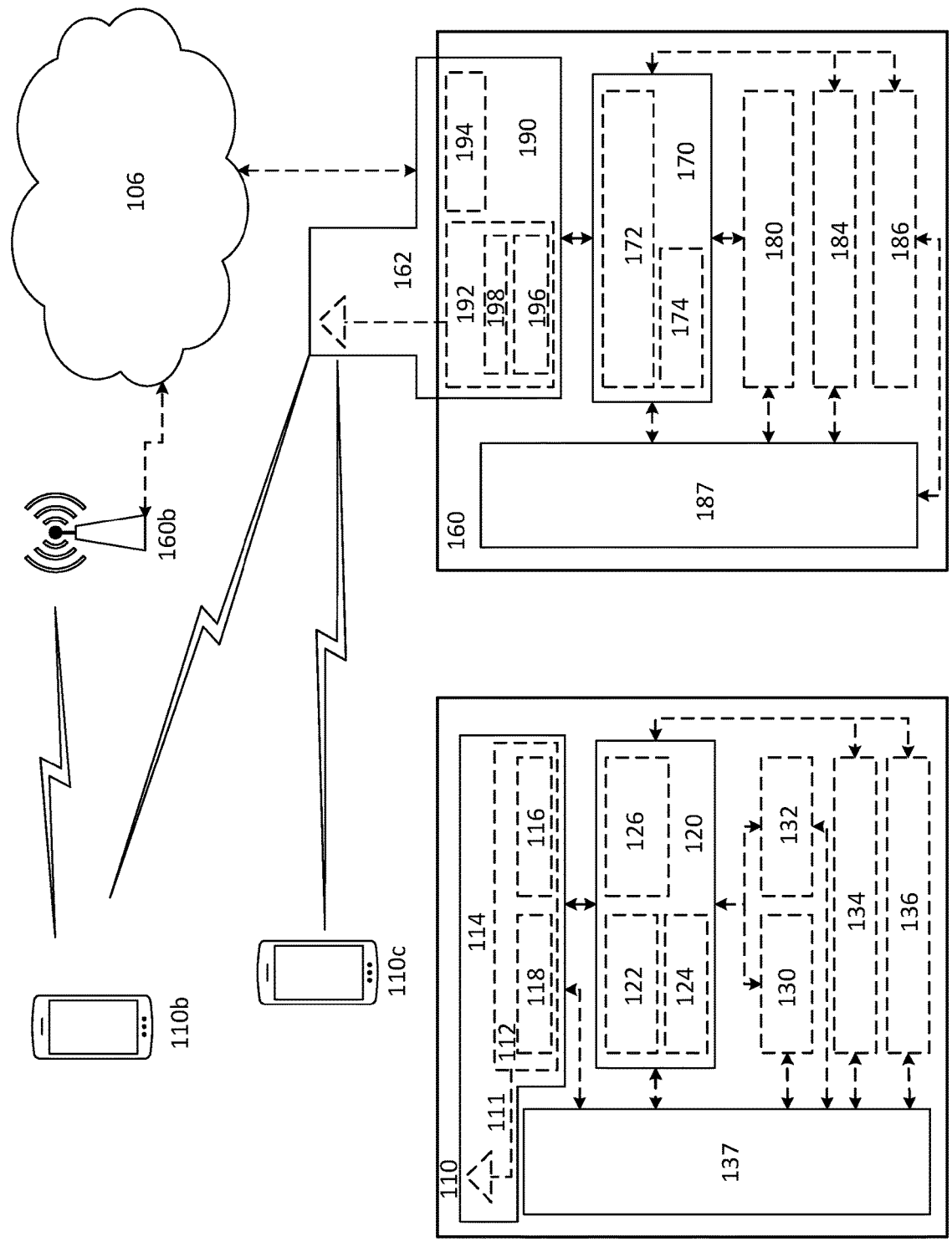
FIG. 5 illustrates an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 106, network nodes 160 and 160*b*, and wireless devices 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centers (MSCs), Mobility Management Entities (MMEs)), Operation and Maintenance (O&M) nodes, Operation Support System (OSS) nodes, Self-Optimized Network (SON) nodes, positioning nodes (e.g., Evolved-Serving Mobile Location Centre (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 160 includes processing circuitry 170, device readable medium 180, interface 190, auxiliary equipment 184, power source 186, power circuitry 187, and antenna 162. Although network node 160 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, Global System for Mobile communication (GSM), Wide Code Division Multiplexing Access (WCDMA), LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 5 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (wireless device) refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hardwired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network, and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. Wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 6:
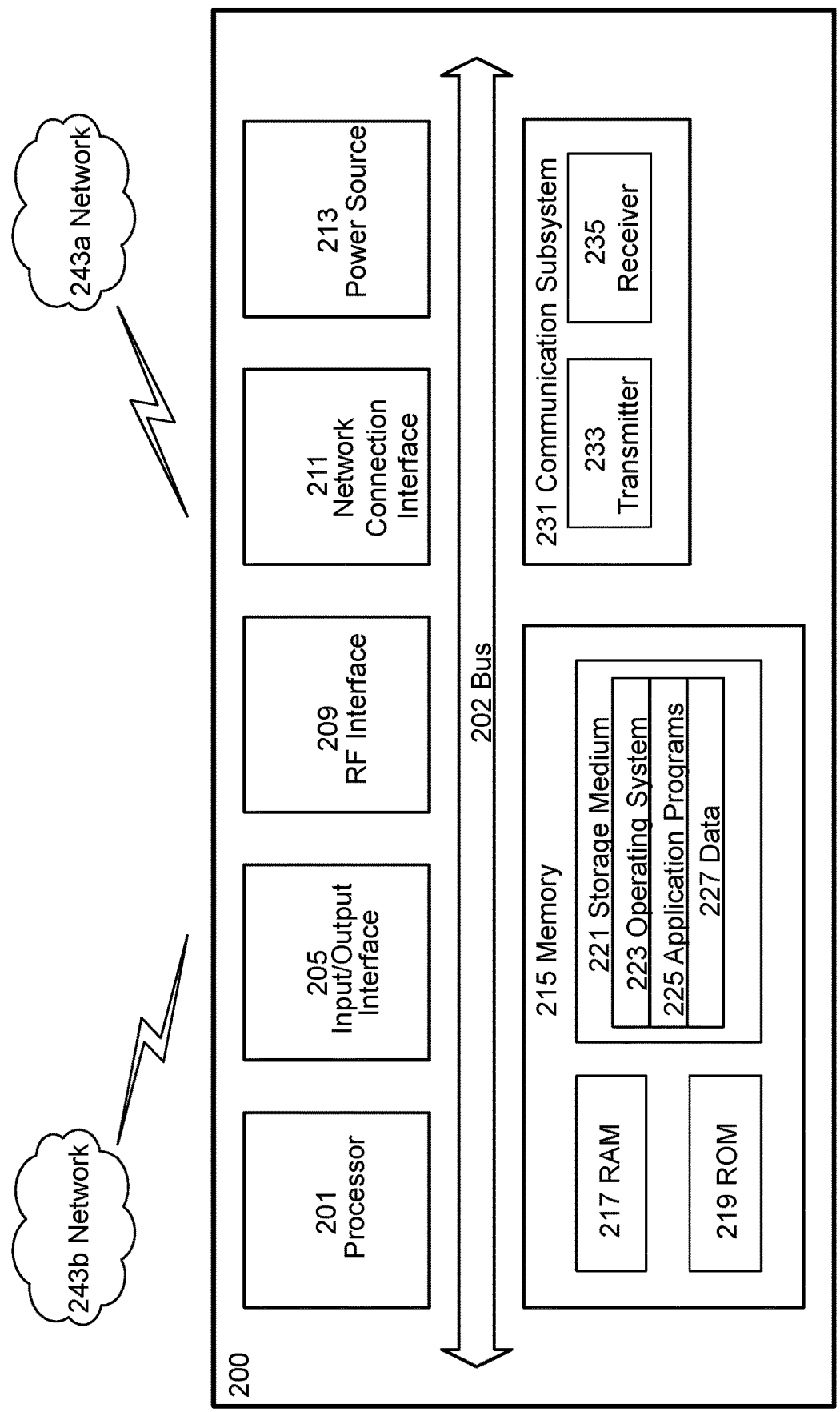
FIG. 6 illustrates an example of a User Equipment in accordance with some embodiments.

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 6, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 6 is a UE, the components discussed herein are equally applicable to a wireless device, and vice-versa.

In FIG. 6, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 6, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, Universal Terrestrial Radio Access Network (UTRAN), WiMax, or the like. Each transceiver may include transmitter 233 and/or receiver 235 to implement transmitter or receiver functionality, respectively, appropriate to the Radio Access Network (RAN) links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 7:
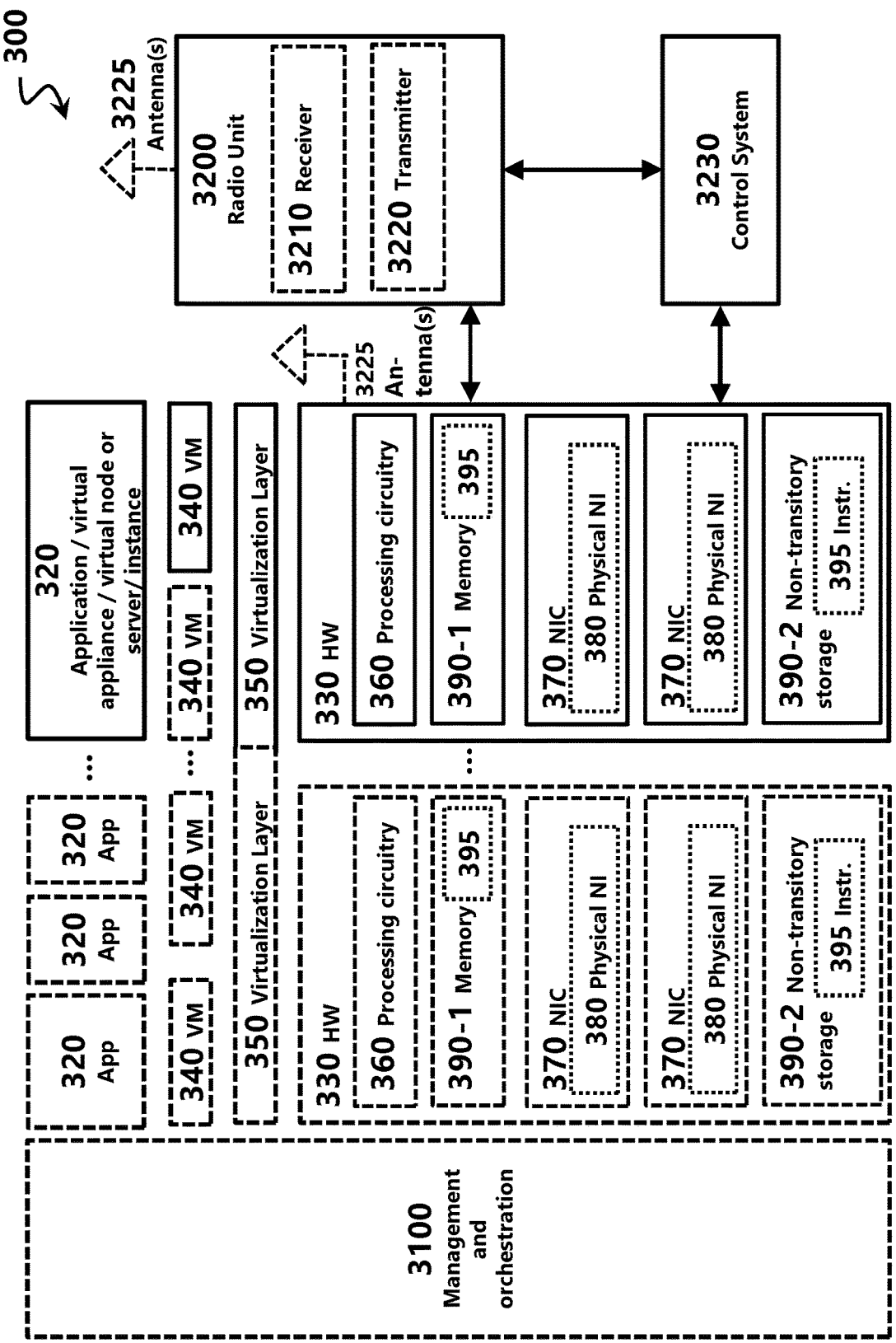
FIG. 7 illustrates an example of a virtualization environment in accordance with some embodiments.

FIG. 7 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 7, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 7.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 8:
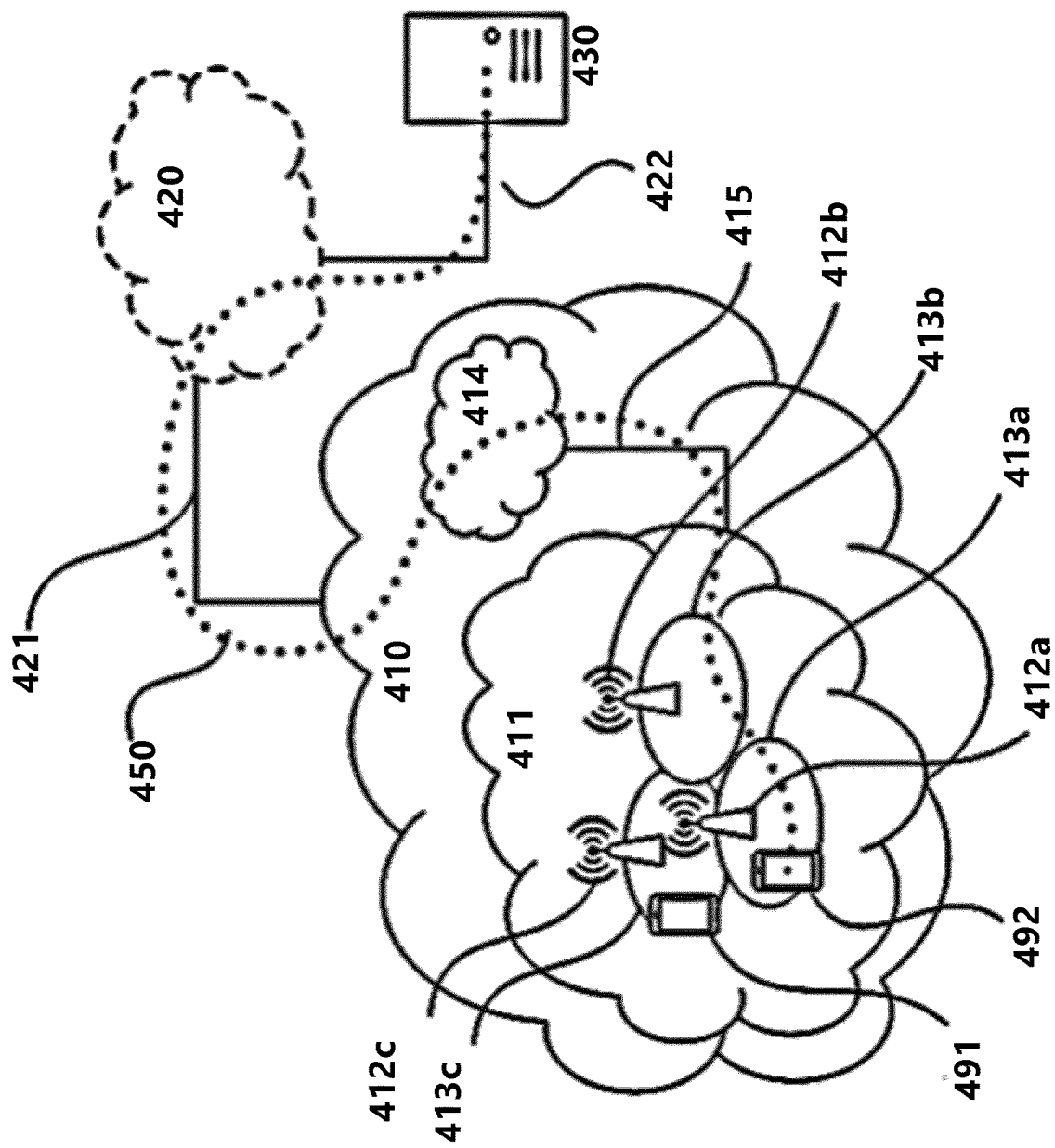
FIG. 8 illustrates an example of a telecommunication network connected via an intermediate network to a host computer in accordance with some embodiments.

With reference to FIG. 8, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 8 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 9. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 9) served by base station 520. Communication interface 526 may be configured to facilitate connection 560 to host computer 510. Connection 560 may be direct or it may pass through a core network (not shown in FIG. 9) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 9:
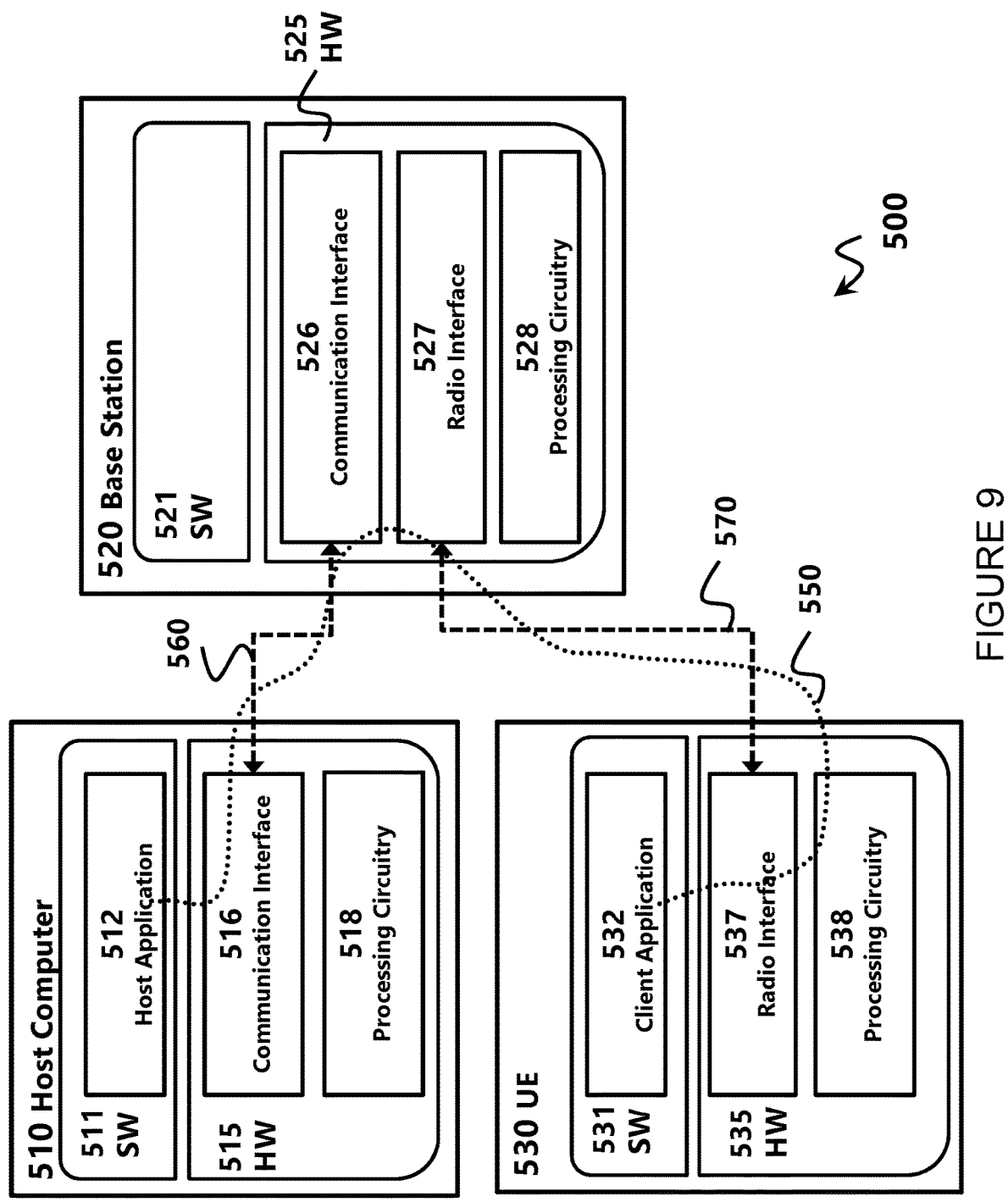
FIG. 9 illustrates an example of a host computer communicating via a base station with a user equipment over a partially wireless connection in accordance with some embodiments.

It is noted that host computer 510, base station 520 and UE 530 illustrated in FIG. 9 may be similar or identical to host computer 430, one of base stations 412*a*, 412*b*, 412*c* and one of UEs 491, 492 of FIG. 8, respectively. This is to say, the inner workings of these entities may be as shown in FIG. 9 and independently, the surrounding network topology may be that of FIG. 8.

In FIG. 9, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate and latency and thereby provide benefits such as reduced waiting time, better responsiveness, and relaxed restriction on file size.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 10:
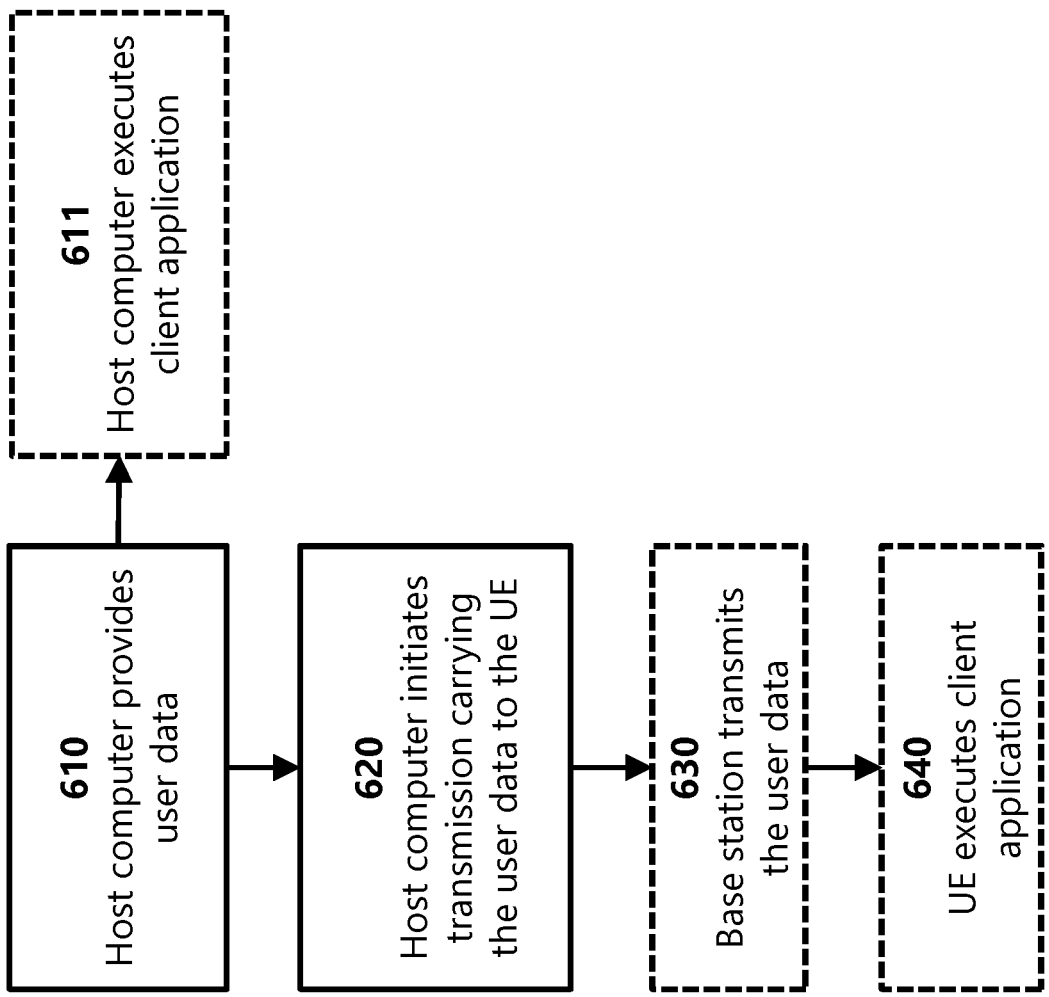
FIG. 10 illustrates an example of methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 11:
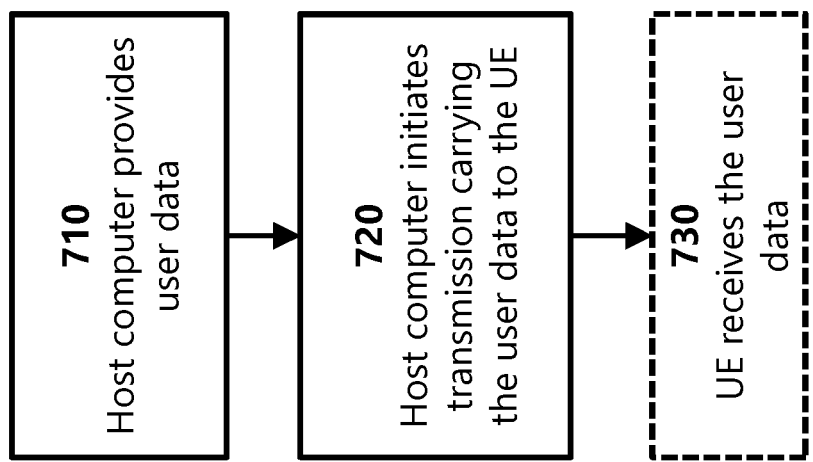
FIG. 11 illustrates an example of methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 12:
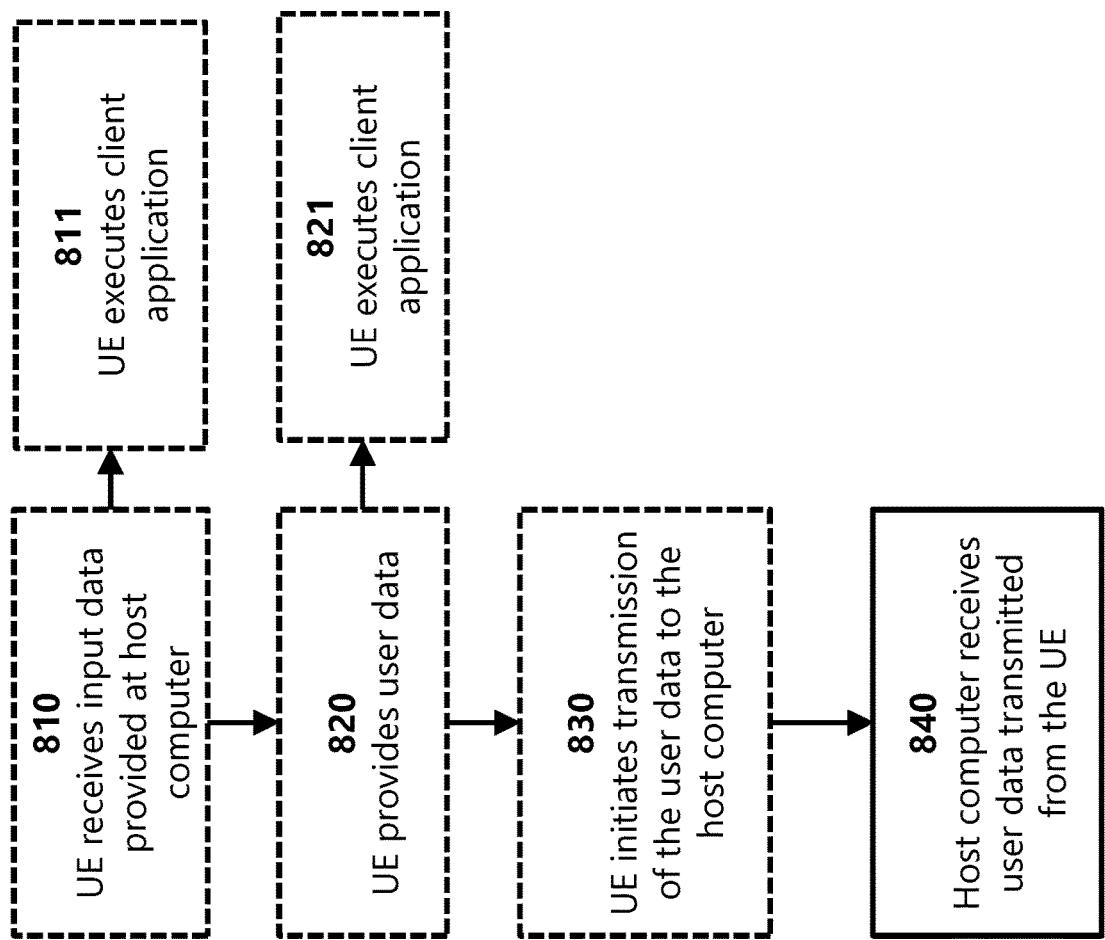
FIG. 12 illustrates an example of methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 13:
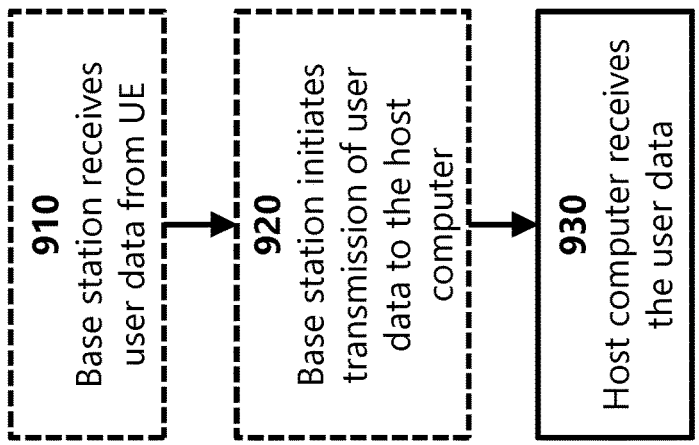
FIG. 13 illustrates an example of methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

EMBODIMENTS

Group A Embodiments

1. A method performed by a wireless device for handling overlapping grants, the method comprising:
   a. receiving a first grant and a second grant from a network node, wherein the first grant and second grant are overlapping;
   b. obtaining an indication for each of the first grant and the second grant, wherein the indication is associated with the respective grant's reliability and/or latency;
   c. based on the indications for both the first grant and the second grant, constructing a Medium Access Control (MAC) Protocol Description Unit (PDU) for at least one of the first grant and the second grant.
2. The method of embodiment 1, wherein if both the first grant and the second grant are dynamic grants, constructing a MAC PDU for at least one of the first grant and the second grant comprises constructing a MAC PDU for each of the first grant and the second grant.
3. The method of embodiment 2, wherein the Physical Layer (PHY) determines which of the constructed MAC PDUs based on which of the indications of the first grant and the second grant is associated with the higher reliability and/or lower latency.
4. The method of any of the previous embodiments, wherein before a MAC PDU has been constructed based on one of the first grant and the second grant, the method further comprises determining for which of the first grant and the second grant to construct a MAC PDU based on the indications for both the first grant and the second grant.
5. The method of embodiment 4, wherein determining for which of the first grant and the second grant to construct a MAC PDU is based on whether the first grant or the second grant has available data in a logical channel available based on the indications.
6. The method of embodiment 5, wherein if both the first grant and the second grant have data available in associated logical channels, a MAC PDU is constructed for a respective grant of the first grant and the second grant that has the respective indication associated with the higher reliability and/or lower latency.
7. The method of any of the previous embodiments, wherein if the second grant is received after the beginning of constructing a MAC PDU for the first grant, the method further comprises:
   a. determining to construct a MAC PDU for the second grant and preempt the first grant if the second grant has data available in an associated logical channel and the indication for the second grant is associated with a higher reliability and/or lower latency than the indication for the first grant; and
   b. determining to ignore the second grant and send a MAC PDU for the first grant to the physical layer if the second grant does not have data available in an associated logical channel or if the indication of the second grant is associated with a lower reliability and/or high latency than the indication for the first grant.

8. The method of any of the previous embodiments, further comprising passing the respective grant of the first grant and the second grant for which a MAC PDU has been constructed to a Hybrid Automatic Repeat Request (HARQ) entity.
9. The method of any of the previous embodiments, wherein constructing a MAC PDU for at least one of the first grant and the second grant is further based on whether the first grant and/or the second grant is a dynamic grant or a configured grant.
10. The method of embodiment 9, wherein the first grant is a configured grant and the second grant is a dynamic grant and wherein:
   a. a MAC PDU is constructed for the first grant if the first grant is associated with a higher reliability and/or lower latency than the indication for the second grant; and
   b. a MAC PDU is constructed for the second grant if the second grant is associated with a higher or equal reliability and/or higher or equal lower latency than the indication for the first grant.
11. The method of embodiment 9, wherein the first grant is a configured grant and the second grant is a dynamic grant and wherein:
   a. a MAC PDU is constructed for the first grant if the first grant is associated with a higher or equal reliability and/or lower or equal latency than the indication for the second grant; and
   b. a MAC PDU is constructed for the second grant if the second grant is associated with a higher reliability and/or higher lower latency than the indication for the first grant.
12. The method of any of the previous embodiments, further comprising obtaining a MAC PDU canceled indicator at the MAC of the wireless device if the MAC determines to preempt a previous MAC PDU with a MAC PDU for a later received grant.
13. The method of any of the previous embodiments, wherein the indication for the first grant or the second grant is based on one or more of a modulation-coding-scheme (MCS), a coding rate, a repetition, an indication of an allowed logical channel, implicit indications of an MCS, coding rate or configuration of a repetition, a transport block size, whether a MAC PDU has been already constructed, whether there is any data in the logical channel that can be multiplexed, etc., associated with the first grant and the second grant.
14. The method of any of the previous embodiments, further comprising:
   providing user data; and
   forwarding the user data to a host computer via the transmission to the base station.

Group B Embodiments

15. A method performed by a base station, the method comprising:
   a. transmitting a first grant of resources to a wireless device, wherein the first grant of resources overlaps with a second grant of resources received at the wireless device;
   b. receiving a transmission from the wireless device using the first grant based on a comparison of indications for each of the first grant and the second grant, wherein the indication is associated with the respective grant's reliability and/or latency.
16. The method of the previous embodiment, further comprising providing to the wireless device the indication for the first grant and/or the second grant.
17. The method of any of the previous embodiments, further comprising transmitting the second grant of resources.
18. The method of any of the previous embodiments, wherein the first and/or second grant is one of a dynamic grant and a configured grant.
19. The method of any of the previous embodiments, further comprising:
   obtaining user data; and
   forwarding the user data to a host computer or a wireless device.

Group C Embodiments

20. A wireless device, the wireless device comprising:
   processing circuitry configured to perform any of the steps of any of the Group A embodiments; and
   power supply circuitry configured to supply power to the wireless device.
21. A base station, the base station comprising:
   processing circuitry configured to perform any of the steps of any of the Group B embodiments;
   power supply circuitry configured to supply power to the base station.
22. A user equipment (UE), the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.
23. A computer program, the computer program comprising instructions which when executed on a computer perform any of the steps of any of the Group A embodiments.
24. A computer program product comprising a computer program, the computer program comprising instructions which when executed on a computer perform any of the steps of any of the Group A embodiments.
25. A non-transitory computer-readable storage medium or carrier comprising a computer program, the computer program comprising instructions which when executed on a computer perform any of the steps of any of the Group A embodiments.
26. A computer program, the computer program comprising instructions which when executed on a computer perform any of the steps of any of the Group B embodiments.
27. A computer program product comprising a computer program, the computer program comprising instructions which when executed on a computer perform any of the steps of any of the Group B embodiments.

28. A non-transitory computer-readable storage medium or carrier comprising a computer program, the computer program comprising instructions which when executed on a computer perform any of the steps of any of the Group B embodiments.

29. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform any of the steps of any of the Group B embodiments.

30. The communication system of the pervious embodiment further including the base station.

31. The communication system of the previous 2 embodiments, further including the UE, wherein the UE is configured to communicate with the base station.

32. The communication system of the previous 3 embodiments, wherein:
   the processing circuitry of the host computer is configured to execute a host application, thereby providing the user data; and
   the UE comprises processing circuitry configured to execute a client application associated with the host application.

33. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs any of the steps of any of the Group B embodiments.

34. The method of the previous embodiment, further comprising, at the base station, transmitting the user data.

35. The method of the previous 2 embodiments, wherein the user data is provided at the host computer by executing a host application, the method further comprising, at the UE, executing a client application associated with the host application.

36. A user equipment (UE) configured to communicate with a base station, the UE comprising a radio interface and processing circuitry configured to performs the of the previous 3 embodiments.

37. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's components configured to perform any of the steps of any of the Group A embodiments.

38. The communication system of the previous embodiment, wherein the cellular network further includes a base station configured to communicate with the UE.

39. The communication system of the previous 2 embodiments, wherein:
   the processing circuitry of the host computer is configured to execute a host application, thereby providing the user data; and
   the UE's processing circuitry is configured to execute a client application associated with the host application.

40. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs any of the steps of any of the Group A embodiments.

41. The method of the previous embodiment, further comprising at the UE, receiving the user data from the base station.

42. A communication system including a host computer comprising:
   communication interface configured to receive user data originating from a transmission from a user equipment (UE) to a base station,
   wherein the UE comprises a radio interface and processing circuitry, the UE's processing circuitry configured to perform any of the steps of any of the Group A embodiments.

43. The communication system of the previous embodiment, further including the UE.

44. The communication system of the previous 2 embodiments, further including the base station, wherein the base station comprises a radio interface configured to communicate with the UE and a communication interface configured to forward to the host computer the user data carried by a transmission from the UE to the base station.

45. The communication system of the previous 3 embodiments, wherein:
   the processing circuitry of the host computer is configured to execute a host application; and
   the UE's processing circuitry is configured to execute a client application associated with the host application, thereby providing the user data.

46. The communication system of the previous 4 embodiments, wherein:
   the processing circuitry of the host computer is configured to execute a host application, thereby providing request data; and
   the UE's processing circuitry is configured to execute a client application associated with the host application, thereby providing the user data in response to the request data.

47. A method implemented in a communication system including a host computer, a base station and a user equipment (UE), the method comprising:
   at the host computer, receiving user data transmitted to the base station from the UE, wherein the UE performs any of the steps of any of the Group A embodiments.

48. The method of the previous embodiment, further comprising, at the UE, providing the user data to the base station.

49. The method of the previous 2 embodiments, further comprising:
   at the UE, executing a client application, thereby providing the user data to be transmitted; and at the host computer, executing a host application associated with the client application.

50. The method of the previous 3 embodiments, further comprising:
   at the UE, executing a client application; and
   at the UE, receiving input data to the client application, the input data being provided at the host computer by executing a host application associated with the client application,
   wherein the user data to be transmitted is provided by the client application in response to the input data.

51. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

52. The communication system of the previous embodiment further including the base station.

53. The communication system of the previous 2 embodiments, further including the UE, wherein the UE is configured to communicate with the base station.

54. The communication system of the previous 3 embodiments, wherein:
   the processing circuitry of the host computer is configured to execute a host application;
   the UE is configured to execute a client application associated with the host application, thereby providing the user data to be received by the host computer.

55. A method implemented in a communication system including a host computer, a base station and a user equipment (UE), the method comprising:
   at the host computer, receiving, from the base station, user data originating from a transmission which the base station has received from the UE, wherein the UE performs any of the steps of any of the Group A embodiments.

56. The method of the previous embodiment, further comprising at the base station, receiving the user data from the UE.

57. The method of the previous 2 embodiments, further comprising at the base station, initiating a transmission of the received user data to the host computer.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the following claims.

The invention claimed is:

1. A method performed by a wireless device, the method comprising:
   receiving a first grant and a second grant from a network node, wherein the first grant and the second grant are overlapping;
   determining a prioritized one of the first grant and the second grant; and
   in response to determining the prioritized one of the first grant and the second grant, constructing a Medium Access Control (MAC) Protocol Data Unit (PDU) for the prioritized grant of the first grant and the second grant;
   wherein determining the prioritized grant is based on having data available in an associated logical channel for each of the first grant and the second grant; and
   wherein,
      one of the first grant and the second grant corresponds to a dynamic grant, the other of the first grant and the second grant corresponds to a configured grant; and
      when the priority associated with the first grant equals the priority associated with the second grant, determining the prioritized grant further comprises determining that the dynamic grant has the higher priority.

2. The method of claim 1, wherein constructing the MAC PDU for the prioritized grant comprises:
   constructing a new MAC PDU for the prioritized grant of the first grant and the second grant based on not having begun construction of any MAC PDU for the first grant prior to receiving the second grant.

3. The method of claim 1, wherein, when the wireless device has not begun construction of any MAC PDU for the first grant prior to receiving the second grant, only one MAC PDU is constructed with respect to the first grant and the second grant that are overlapping, the only one MAC PDU constructed for the prioritized grant of the first grant and the second grant.

4. The method of claim 1, wherein when the second grant is determined to be the prioritized grant and construction has begun on a first MAC PDU for the first grant prior to receiving the second grant, constructing the MAC PDU for the prioritized grant comprises:
   constructing the MAC PDU for the second grant; and
   pre-empting the first MAC PDU.

5. The method of claim 1, wherein when the first grant is determined to be the prioritized grant and construction has begun on a first MAC PDU for the first grant prior to receiving the second grant, constructing the MAC PDU for the prioritized grant comprises:
   ignoring the second grant; and
   proceeding with the first MAC PDU.

6. The method of claim 1, further comprising:
   passing the MAC PDU for the prioritized grant to a Hybrid Automatic Repeat Request (HARQ) entity.

7. The method of claim 1, wherein:
   one of the first grant and the second grant corresponds to a dynamic grant; and
   the other of the first grant and the second grant corresponds to a configured grant.

8. The method of claim 1, further comprising:
   obtaining the priority associated with the first grant based on signalling from a network node.

9. A wireless device, the wireless device comprising:
   power supply circuitry configured to supply power to the wireless device; and processing circuitry configured to:
receive a first grant and a second grant from a network node, wherein the first grant and the second grant are overlapping;
determine a prioritized one of the first grant and the second grant; and
in response to the determination of the prioritized one of the first grant and the second grant, construct a Medium Access Control (MAC) Protocol Data Unit (PDU) for the prioritized grant of the first grant and the second grant;
wherein the processing circuitry is configured to determine the prioritized grant based on having data available in an associated logical channel for each of the first grant and the second grant;
wherein,
one of the first grant and the second grant corresponds to a dynamic grant, and the other of the first grant and the second grant corresponds to a configured grant; and
when the priority associated with the first grant equals the priority associated with the second grant, to determine the prioritized grant, the processing circuitry is further configured to determine that the dynamic grant has the higher priority.

10. The wireless device of claim 9, wherein to construct the MAC PDU for the prioritized grant, the processing circuitry is configured to:
construct a new MAC PDU for the prioritized grant of the first grant and the second grant based on not having begun construction of any MAC PDU for the first grant prior to receiving the second grant.

11. The wireless device of claim 9, wherein when the first grant is determined to be the prioritized grant and construction has begun on a first MAC PDU for the first grant prior to receiving the second grant, to construct the MAC PDU for the prioritized grant, the processing circuitry is further configured to:
ignore the second grant; and
proceed with the first MAC PDU.

12. The wireless device of claim 9, wherein the processing circuitry is further configured to:
pass the MAC PDU for the prioritized grant to a Hybrid Automatic Repeat Request (HARQ) entity.

13. The wireless device of claim 9, wherein:
one of the first grant and the second grant corresponds to a dynamic grant; and
the other of the first grant and the second grant corresponds to a configured grant.

14. The wireless device of claim 9, wherein the processing circuitry is further configured to:
obtain the priority associated with the first grant based on signalling from a network node.

15. A method performed by a network node, the method comprising:
transmitting a first grant and a second grant to a wireless device, wherein the first grant and the second grant are overlapping; and
receiving a transmission from the wireless device on a prioritized one of the first grant and the second grant;
wherein the prioritized grant is based on the wireless device having data available in an associated logical channel for each of the first grant and the second grant, and
wherein receiving the transmission from the wireless device on the prioritized one of the first grant and the second grant is responsive to a Medium Access Control (MAC) Protocol Data Unit (PDU) for the prioritized one of the first grant and the second grant being determined;
wherein,
one of the first grant and the second grant corresponds to a dynamic grant, and the other of the first grant and the second grant corresponds to a configured grant; and
when the priority associated with the first grant equals the priority associated with the second grant, receiving the transmission from the wireless device on the prioritized one of the first grant and the second grant comprises receiving the transmission on the dynamic grant.

16. The method of claim 15, wherein:
one of the first grant and the second grant corresponds to a dynamic grant; and
the other of the first grant and the second grant corresponds to a configured grant.

17. The method of claim 15, further comprising:
indicating to the wireless device, a priority associated with the first grant.

18. A network node, the network node comprising:
power supply circuitry configured to supply power to the network node; and
processing circuitry configured to:
transmit a first grant and a second grant to a wireless device, wherein the first grant and the second grant are overlapping; and
receive a transmission from the wireless device on a prioritized one of the first grant and the second grant;
wherein the prioritized grant is based on the wireless device having data available in an associated logical channel for each of the first grant and the second grant,
wherein a receipt of the transmission from the wireless device on the prioritized one of the first grant and the second grant is responsive to a Medium Access Control (MAC) Protocol Data Unit (PDU) for the prioritized one of the first grant and the second grant being determined, and
wherein,
one of the first grant and the second grant corresponds to a dynamic grant, and the other of the first grant and the second grant corresponds to a configured grant; and
when the priority associated with the first grant equals the priority associated with the second grant, to receive the transmission from the wireless device on the prioritized one of the first grant and the second grant, the processing circuitry further configured to receive the transmission on the dynamic grant.

19. The network node of claim 18, wherein:
one of the first grant and the second grant corresponds to a dynamic grant; and
the other of the first grant and the second grant corresponds to a configured grant.

20. The network node of claim 18, wherein the processing circuitry is further configured to:
indicate, to the wireless device, a priority associated with the first grant.

* * * * *